Patented Jan. 6, 1948

2,434,099

UNITED STATES PATENT OFFICE 2,434,099

HALOGENOPHENYLTHIO - 2,3 - EPOXYPROPANES AND HALOGENOPHENYLTHIO-2,3-PROPANEDIOLS

Euclid Wilfred Bousquet, Wilmington, Del., assignor to E. I. du Pont de Nemours & Company, Wilmington, Del., a corporation of Delaware No Drawing. Application June 19, 1945, Serial No. 600,405

5 Claims. (Cl. 260—348)

This invention relates to new compositions of matter and more particularly to hydroxylated and amino derivatives of halogenoarylthiopropanes.

This invention has as an object the production of new and useful compositions of matter. A further object is the provision of halogenoarylthiopropanols, halogenoarylthioepoxypropanes, and halogenoarylthioaminopropanols. Other objects will be apparent from the following description of the invention.

These objects are accomplished by a neutral to basic organic compound containing a halogenarylthiomethylene radical attached to a hydrogen-bearing carbon atom, one of the remaining valences of which hydrogen-bearing, secondary carbon atom is satisfied by oxy oxygen and the remaining valence of said secondary, hydrogen-bearing carbon atom is satisfied by a primary carbon atom which bears two hydrogens and to which is attached by a single bond an inorganic element of atomic number of 7 to 8. These compounds are oxy and amino derivatives of halogenoarylthiopropanes and are of the general formula

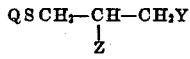

wherein Q is a halogenaryl radical, Z is hydroxyl, Y is hydroxyl, amino, substituted amino and preferably hydrocarbon substituted amino, and Y and Z together may be oxygen.

The preferred products of this invention, i. e., the 3-halogenoarylthio-1,2-propanediols and the corresponding epoxides are readily prepared by reacting a halogenoarylthiol, e. g., p-chlorophenylthio, in an aqueous alkali metal hydroxide solution with an epihalohydrin at temperatures ranging from 10°–100° C., preferably within the range of 25°–50° C.

In order to obtain the 3-halogenoarylthio-1-amino-2-propanol, the epoxypropanes obtained as described above are reacted with the desired amino compound, e. g., di-n-butylamine, at temperatures ranging from 100–200° C., and preferably within the range of 125–185° C. The product is isolated as the hydrochloride by saturating an ethereal solution of the reaction product with dry halogen chloride.

The more detailed practice of the invention is illustrated by the following examples, wherein parts given are by weight. There are, of course, many forms of the invention other than these specific embodiments.

Example I

To a solution of 58 parts of p-chlorophenylthiol and 22.4 parts of potassium hydroxide in 450 parts of water was added slowly, with stirring and maintenance of the temperature below 50° C. (25–50° C.), 37 parts of epichlorohydrin. After the addition of the epichlorohydrin was complete, the reaction mixture was heated for one-half hour at 50° C. while stirring. The reaction products were then extracted from the cold reaction mixture with ether, washed with small portions of 5% potassium hydroxide solution and then distilled. There were thus obtained 42 parts of (a) 3-(p-chlorophenylthio)-1,2-epoxypropane boiling at 132–137° C./3 mm. and 18 parts of (b) 3-(p-chlorophenylthio)-1,2-propanediol boiling at 158–162° C./3 mm. Analysis: Calculated for (a) C₉H₉ClOS: S, 15.96%; found: S, 15.97%. Calculated for (b) C₉H₁₀ClO₂S: S, 14.64%, found: S, 13.93%.

Example II

A mixture of 14 parts of 3-(p-chlorophenylthio)-1,2-epoxypropane, prepared as described in Example I, and 9 parts of di-n-butylamine was heated at 165° C. for one-half hour. The reaction mixture was then cooled to room temperature, 50 parts of ether was added and dry hydrogen chloride gas was bubbled into the solution until no further precipitation occurred. There was thus obtained 22 parts of 1-(p-chlorophenylthio)-3-(di-n-butylamino) - 2 - propanol hydrochloride melting at 90–91° C. On titration with 0.1 N-sodium hydroxide this product showed a neutral equivalent of 365.8 as compared to the calculated value of 366. Analysis: Calculated for C₁₇H₂₈ClNOS.HCl: Cl, 19.40%; found: Cl, 19.39%.

Although the invention is illustrated above with the preparation of p-chlorophenylthiopropanediol, p-chlorophenylthioepoxy propane, and p-chlorophenylthio-di-n-butylaminopropanol, it is applicable to the preparation of 1-halogenoarylthio-2,3-propanediols, 1 - halogenoarylthio - 2,3-epoxypropanes, and 1-halogenoaryl-3-amino-2-propanols generally by the reaction of the corresponding halogenoarylthiol with the appropriate epihalohydrin. Thus the use of o-chlorophenylthiol, o-bromophenylthiol, p-bromophenylthiol and 4-chloronaphthylthiol-1 results in the production of the corresponding o-chlorophenyl, o-bromophenyl, p-bromophenyl, and 1-(4-chloronaphthyl) derivatives.

In the preparation of the halogenoarylthioaminopropanols, the halogenoarylthioepoxypropanes can be reacted with any ammonia type compound having at least one hydrogen atom on the amino nitrogen, the remaining valences of which are satisfied by hydrogen, or monovalent hydrocarbon radicals, preferably aliphatic and more preferably saturated. Examples of ammonia type compounds of this class include ammonia; saturated aliphatic amines, e. g., methylamine, dimethylamine, isobutylamine, diisobutylamine, octylamine, dodecylamine and octadecylamine; unsaturated aliphatic amines, e. g., allylamine and oleylamine; and aromatic amines, e. g., aniline, N-methylaniline and toluidine. Compounds having but one ammonia type nitrogen are preferred.

The products of this invention are useful for various purposes. They may be used as intermediates for the preparation of other derivatives of the halogenoarylthiopropanes, as pharmaceutical and pest control agents, e. g., bactericides, fungicides, insecticides, moth-proofing agents and as additive agents in the preparation of elastomers and as plant growth regulants.

I wish it to be understood that my invention is not limited to the exact details shown and described for obvious modifications will occur to a person skilled in the art.

What is claimed is:
1. 1-p-chlorophenylthio-2,3-epoxypropane.
2. A 1-halogenophenylthio-2,3-epoxypropane.
3. 1-p-chlorophenylthio-2,3-propanediol.
4. A 1-halogenophenylthio-2,3-propanediol.
5. An organic compound of the general formula

$$QSCH_2-CH-CH_2$$
$$\phantom{QSCH_2-}|\phantom{CH-}|$$
$$\phantom{QSCH_2-}Z\phantom{CH-}Y$$

wherein Q is a halogenophenyl radical and Y and Z are selected from the class consisting of hydoxyl and, in combination with each other, ether oxygen.

EUCLID WILFRED BOUSQUET.

REFERENCES CITED

The following references are of record in the file of this patent:

UNITED STATES PATENTS

| Number | Name | Date |
|---|---|---|
| 2,107,366 | Bruson | Feb. 8, 1938 |
| 2,266,737 | Bruson | Dec. 23, 1941 |
| 2,291,528 | Bruson | July 28, 1942 |

FOREIGN PATENTS

| Number | Country | Date |
|---|---|---|
| 409,030 | Great Britain | Apr. 26, 1934 |

OTHER REFERENCES

Marle, "Journal Chem. Soc.," London, vol. 101 (1912), pp. 305–317.

Fieser et al., "Organic Chemistry," page 32 (1944), Heath & Co., publishers, Boston.

"Science News Letter," March 22, 1947, page 188.